United States Patent
Abe et al.

(10) Patent No.: US 9,597,836 B2
(45) Date of Patent: Mar. 21, 2017

(54) METHOD FOR MANUFACTURING THREE-DIMENSIONAL SHAPED OBJECT

(71) Applicant: PANASONIC INTELLECTUAL PROPERTY MANAGEMENT CO., LTD., Osaka (JP)

(72) Inventors: Satoshi Abe, Osaka (JP); Isamu Matsumoto, Osaka (JP); Masataka Takenami, Osaka (JP); Masaki Kondo, Osaka (JP); Isao Fuwa, Osaka (JP); Yoshiyuki Uchinono, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 175 days.

(21) Appl. No.: 14/413,350

(22) PCT Filed: Mar. 6, 2013

(86) PCT No.: PCT/JP2013/001378
§ 371 (c)(1),
(2) Date: Jan. 7, 2015

(87) PCT Pub. No.: WO2014/010144
PCT Pub. Date: Jan. 16, 2014

(65) Prior Publication Data
US 2015/0183165 A1 Jul. 2, 2015

(30) Foreign Application Priority Data
Jul. 9, 2012 (JP) .................... 2012-153738

(51) Int. Cl.
B29C 71/04 (2006.01)
B29C 67/00 (2006.01)
(Continued)

(52) U.S. Cl.
CPC .......... *B29C 67/0077* (2013.01); *B22F 3/105* (2013.01); *B22F 3/1055* (2013.01);
(Continued)

(58) Field of Classification Search
CPC B22F 3/105; B22F 3/1055; B22F 2003/1056; B22F 2003/1057;
(Continued)

(56) References Cited

U.S. PATENT DOCUMENTS 5,597,589 A 1/1997 Deckard
5,904,890 A 5/1999 Lohner et al.
(Continued)

FOREIGN PATENT DOCUMENTS

CN 1347783 5/2002
CN 101541512 9/2009
(Continued)

OTHER PUBLICATIONS

English Translation of the Search report from International Patent Appl. No. PCT/JP2013/001378, mail date is Jun. 4, 2013.
(Continued)

*Primary Examiner* — Leo B Tentoni
(74) *Attorney, Agent, or Firm* — Greenblum & Bernstein, P.L.C.

(57) ABSTRACT

There is provided a manufacturing method of the three-dimensional shaped object, the method being capable of suitably reducing the local raised portion which can occur during the light beam irradiation under the condition of the divided sub-irradiation paths. The manufacturing method of the present invention is performed by repetition of a powder-layer forming and a solidified-layer forming, wherein an irradiation path of the light beam is divided into a plurality of sub-irradiation paths including a short sub-irradiation path with its length being shorter than a predetermined
(Continued)

length and a long sub-irradiation path with its length being the predetermined length or longer, and wherein an irradiation mode of the light beam is changed depending on the lengths of the sub-irradiation paths.

8 Claims, 14 Drawing Sheets

(51) Int. Cl.
  *B29C 69/00* (2006.01)
  *B22F 3/105* (2006.01)
  *B22F 5/00* (2006.01)
  *B22F 3/16* (2006.01)
  *B33Y 10/00* (2015.01)
  B29C 35/08 (2006.01)
  B29K 105/00 (2006.01)

(52) U.S. Cl.
  CPC ............... *B22F 3/16* (2013.01); *B22F 5/007* (2013.01); *B29C 35/0805* (2013.01); *B29C 69/001* (2013.01); *B33Y 10/00* (2014.12); B22F 2003/1056 (2013.01); B29C 2035/0827 (2013.01); B29C 2035/0833 (2013.01); B29C 2035/0838 (2013.01); B29K 2105/00 (2013.01); Y02P 10/292 (2015.11); Y02P 10/295 (2015.11)

(58) Field of Classification Search
  CPC ..... B22F 2003/1058; B22F 2003/1059; B29C 35/08; B29C 35/0805; B29C 2035/0827; B29C 2035/0833; B29C 2035/0838; B29C 41/02; B29C 67/0051; B29C 67/0077; B29C 67/0081; B29C 67/0085; B29C 67/0088; B29C 67/0092; B29C 67/0096; B29C 71/04
  USPC ....... 264/405, 460, 461, 462, 463, 482, 485, 264/494, 496, 497; 219/121.6, 121.61, 219/121.62, 121.65, 121.66, 121.85
  See application file for complete search history.

(56) References Cited

U.S. PATENT DOCUMENTS

| 6,215,093 | B1 | 4/2001 | Meiners et al. |
| 6,657,155 | B2 | 12/2003 | Abe et al. |
| 7,754,135 | B2 | 7/2010 | Abe et al. |
| 8,057,731 | B2 | 11/2011 | Abe |
| 8,163,224 | B2 | 4/2012 | Higashi et al. |
| 8,221,850 | B2 | 7/2012 | Fuwa |
| 2002/0041818 | A1 | 4/2002 | Abe et al. |
| 2008/0099936 | A1 | 5/2008 | Takinami et al. |
| 2009/0121393 | A1 | 5/2009 | Abe |
| 2010/0176539 | A1 | 7/2010 | Higashi et al. |

FOREIGN PATENT DOCUMENTS

| JP | 1-502890 | 10/1989 |
| JP | 10-507704 | 7/1998 |
| JP | 2000-73108 | 3/2000 |
| JP | 2001-504897 | 4/2001 |
| JP | 2003-321704 | 11/2003 |
| JP | 2004-284025 | 10/2004 |
| JP | 2008-111151 | 5/2008 |
| JP | 2008-155538 | 7/2008 |
| JP | 2009-22576 | 2/2009 |
| WO | 88/02677 | 4/1988 |
| WO | 2007/058160 | 5/2007 |

OTHER PUBLICATIONS

J. P. Kruth et al., "Selective laser melting of iron-based powder", Journal of Materials Processing Technology, vol. 149, No. 1-3 (2004), pp. 616-622.

English Translation of the International Preliminary Report on Patentability for PCT/JP2013/001378, mailed Jan. 13, 2015.

Office Action issued in China Counterpart Patent Appl. No. 201380036467.5, dated Aug. 6, 2015, along with an English translation thereof.

Fig. 9 Long sub-irradiation path located adjacent to short sub-irradiation path

Short sub-irradiation path

Scan direction of sub-irradiation paths

Short sub-irradiation path

Serial combination of short sub-irradiation path with long sub-irradiation path

Newly formed long sub-irradiation path

New long sub-irradiation path formed by serial combination

Fig. 12
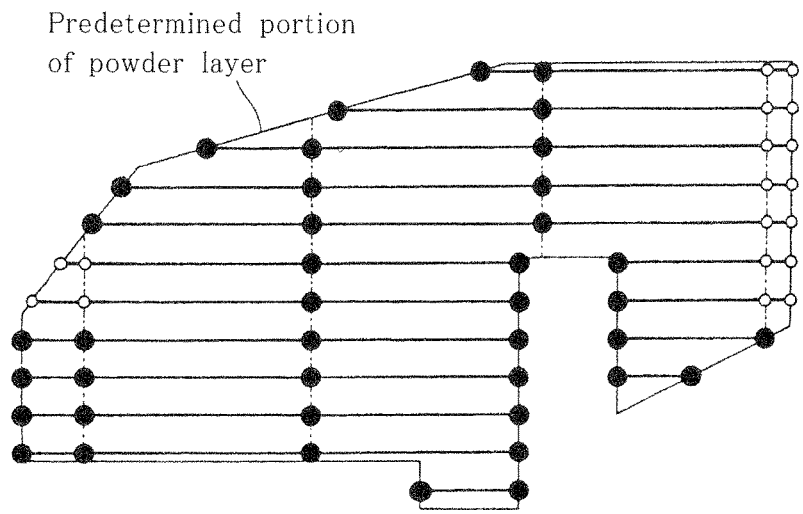
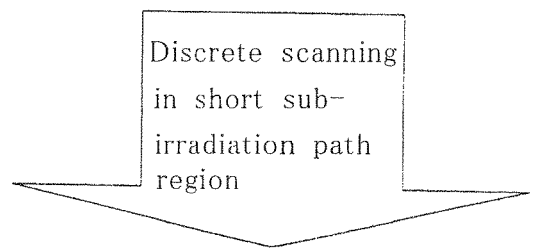
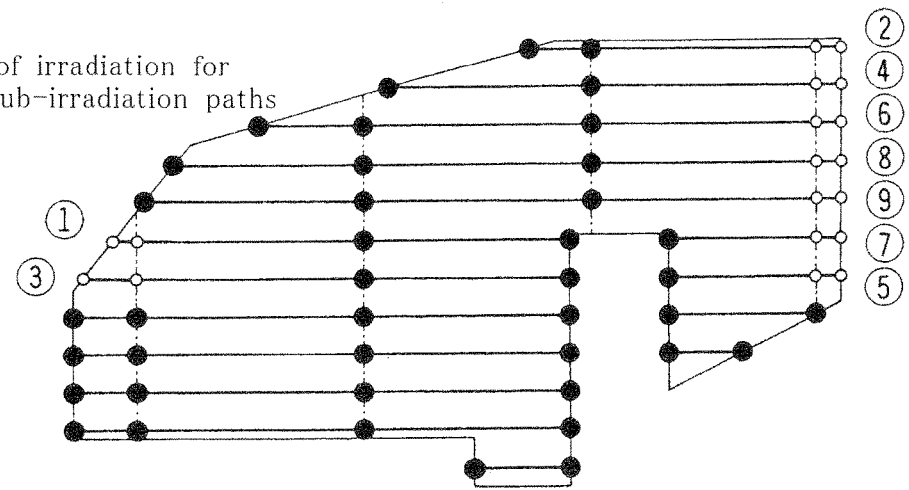

METHOD FOR MANUFACTURING THREE-DIMENSIONAL SHAPED OBJECT

TECHNICAL FIELD

The present invention relates to a method for manufacturing a three-dimensional shaped object. More particularly, the present invention relates to a method for manufacturing a three-dimensional shaped object with a plurality of solidified layers stacked integrally by repeated steps of forming the solidified layer by irradiating a predetermined portion of a powder layer with a light beam.

BACKGROUND OF THE INVENTION

Heretofore, a method for manufacturing a three-dimensional shaped object by irradiating a powder with a light beam has been known (such method can be generally referred to as "selective laser sintering method"). Such method can produce the three-dimensional shaped object with a plurality of solidified layers stacked integrally by repetition of the step (i) of forming the solidified layer by irradiating a predetermined portion of a powder layer with a light beam, thereby allowing sintering of the predetermined portion of the powder or melting and subsequent solidification thereof, and the step (ii) of forming another solidified layer by newly forming a powder layer on the resulting solidified layer, followed by similarly irradiating the powder layer with the light beam (see JP-T-01-502890 or JP-A-2000-73108). The three-dimensional shaped object thus obtained can be used as a metal mold in a case where inorganic powder materials such as a metal powder and a ceramic powder are used as the powder material. While on the other hand, the three-dimensional shaped object can be used as a model or replica in a case where organic powder materials such as a resin powder and a plastic powder are used as the powder material. This kind of technology makes it possible to produce the three-dimensional shaped object with a complicated contour shape in a short period of time.

By way of a case wherein the metal powder is used as the powder material, and the three-dimensional shaped object is used as the metal mold, the selective laser sintering method will be described. As shown in FIGS. 1A and 1B, a powder layer 22 with a predetermined thickness "t1" is firstly formed on a base plate 21 (see FIG. 1A) and then a predetermined portion of the powder layer 22 is irradiated with a light beam to form a solidified layer 24. Thereafter, another powder layer 22 is newly provided on the solidified layer 24 thus formed, and then is irradiated again with the light beam to form another solidified layer. In this way, the solidified layers are repeatedly formed, making it possible to produce a three-dimensional shaped object with a plurality of the solidified layers 24 stacked integrally (see FIG. 1B). The lowermost solidified layer can be provided in a state of being adhered to the surface of the base plate. Therefore, the three-dimensional shaped object and the base plate are integrated with each other. The integrated "three-dimensional shaped object" and "base plate" can be used as the metal mold as they are.

PATENT DOCUMENTS (RELATED ART PATENT DOCUMENTS)

PATENT DOCUMENT 1: Japanese Unexamined Patent Application Publication No. H01-502890

PATENT DOCUMENT 2: Japanese Unexamined Patent Application Publication No. 2000-73108

DISCLOSURE OF THE INVENTION

Problems to be Solved by the Invention

With respect to the selective laser sintering method, the inventors of the present application have found that, when the irradiation of the light beam is performed under a condition of divided irradiation paths, such a phenomenon that is peculiar to the division of the path may occur. More specifically, the inventors have found that, in a case where the irradiation path of the light beam is divided into a plurality of sub-irradiation paths, and the irradiation of the light beam is sequentially performed on a basis of the divided sub-irradiation paths, such a phenomenon that the solidified layer is locally raised may occur (see FIG. 14). In this regard, they have found that the local raised portion tends to occur more often when the light beam irradiation is sequentially performed for short sub-irradiation paths with each of their lengths being a predetermined length or shorter. The occurring of the local raised portion becomes more prominent especially in a case where the short sub-irradiation path is located at a periphery of the irradiated portion (i.e., at an outer circumferential portion of the resulting solidified layer, corresponding to "periphery of predetermined portion of the powder layer"). While not intending to be bound by any specific theory, one of the presumed reasons for the occurring of the locally raised portion is that the temperature can more easily rise in the short sub-irradiation path, and thereby too much melting of the powder/solidified portion can be caused. The melted powder or solidified portion tends to take a ball-like form due to a surface tension thereof. When the large amount of the melted portion is provided, the ball-like shape tends to become larger, which causes a formation of "local raised portion" after a cooling of the melted portion and thus solidification thereof. Another presumed reason for the occurring of the "local raised portion" in the short sub-irradiation path located at the periphery of the irradiated portion is that the irradiated portion with the light beam melts accompanying the inclusion of the adjacent powder, which causes a local agglomeration of the melted portion due to a surface tension thereof.

The local raised portion can bring a disadvantageous effect. For example, a squeegee blade can collide with the local raised portion upon the subsequent supply of the powder, making it impossible to form the desired powder layer. This means that a steady performing of the selective laser sintering method cannot be maintained any longer after the occurring of the local raised portion.

Under these circumstances, the present invention has been created. That is, an object of the present invention is to provide a manufacturing method of the three-dimensional shaped object, the method being capable of suitably reducing the local raised portion which can occur during the irradiation of the light beam under the condition of the divided sub-irradiation paths.

Means for Solving the Problems

In order to achieve the above object, one embodiment of the present invention provides a method for manufacturing a three-dimensional shaped object, the method including the steps of:

(i) forming a solidified layer by irradiating a predetermined portion of a powder layer with a light beam, thereby allowing a sintering of the powder in the predetermined portion or a melting and subsequent solidification thereof, the irradiation of the light beam being performed by a scanning of the light beam; and (ii) forming another solidified layer by newly forming a powder layer on the resulting solidified layer, followed by the irradiation of a predetermined portion of the powder layer with the light beam, the step (ii) being repeatedly performed, wherein an irradiation path of the light beam for the predetermined portion of the powder layer is divided into a plurality of sub-irradiation paths including a short sub-irradiation path with its length being shorter than a predetermined length and a long sub-irradiation path with its length being the predetermined length or longer, and wherein an irradiation mode of the light beam in the steps (i) and (ii) is changed depending on the lengths of the sub-irradiation paths.

The one embodiment of the present invention is characterized in that the solidified layer is suitably formed in consideration of "long and short" concerning of the lengths of the sub-irradiation paths created by the division of the irradiation path.

In a preferred embodiment, with respect to the light beam for the sub-irradiation paths, an energy of the light beam for "short sub-irradiation path with its length being shorter than a predetermined length" is lower than that of "long sub-irradiation path with its length being the predetermined length or longer". In particular, it is preferred that a low output for the irradiation, a large beam-condensation size, or a large pitch of beam paths is provided for the light beam for the short sub-irradiation path, the low output being lower, the large beam-condensation size and the large pitch being larger than those of the long sub-irradiation path.

For example, the irradiation path may be divided such that the short sub-irradiation path is located at an outermost periphery of the predetermined portion of the powder layer.

In a preferred embodiment, the short and long sub-irradiation paths being adjacent to each other are serially combined with each other to create another new long sub-irradiation path.

In another preferred embodiment, in a case where a plurality of the short sub-irradiation paths are adjacent in parallel to each other in a direction perpendicular to a scan direction of the short sub-irradiation paths, a scanning of the light beam is performed in such a perpendicular direction that its path length becomes longer than each length of the short sub-irradiation paths, the perpendicular direction being perpendicular to the scan direction of the short sub-irradiation paths.

In still another preferred embodiment, in a case where paths "a" and "b" of the short sub-irradiation paths are adjacent in parallel to each other in a direction perpendicular to a scan direction of the paths "a" and "b", the light beam irradiation for the path "a" is performed, and subsequently the light beam irradiation for the path "b" is performed at least after a decrease in a temperature of a solidified portion of the path "a".

In still another preferred embodiment, a discrete scanning of the light beam is performed such that the adjacent short sub-irradiation paths are not subjected to a continuous irradiation of the light beam, the adjacent short sub-irradiation paths being adjacent in parallel to each other.

In still another preferred embodiment, the irradiation path is divided on a basis of a contour line of the predetermined portion of the powder layer such that the short sub-irradiation path is not located at an outermost periphery of the predetermined portion.

Effect of the Invention

One embodiment of the present invention can prevent the occurring of "local raised portion" (i.e., local bulge of the solidified layer). In particular, the local raised portion can be prevented from occurring at the region of "short sub-irradiation path". This means that the related-art disadvantage attributed to "local raised portion" can be avoided in accordance with the manufacturing method of the present invention. For example, the manufacturing method according to one embodiment of the present invention can avoid such a disadvantage that the squeegee blade collides with the local raised portion upon the subsequent supply of the powder, the collision of the squeegee blade making it impossible to form the desired powder layer. The manufacturing method according to one embodiment of the present invention can also avoid such a disadvantage that the variation in thickness of the powder layer is caused, the variation being attributed to the presence of the local raised portion.

In other words, even in the case where the irradiation path of the light beam is divided into a plurality of sub-irradiation paths, and the irradiation of the light beam is sequentially performed on a basis of the divided sub-irradiation paths, approximately the uniform thickness can be obtained for each of the solidified portions generated by such sequential scannings. This results in a more uniform solidified layer as a whole. The more uniform solidified layer makes it possible to suitably perform a subsequent formation of the powder layer by the sliding movement of the squeegee blade, which leads to an approximately uniform thickness of the powder layer. The approximately uniform thickness of the powder layer can promote an ensuring of a uniformity of the solidified density of the solidified layer resulted from such powder layer.

As such, the formation of the solidified layer according to the one embodiment of the present invention makes it possible to suitably perform the subsequent formation of the powder layer, which eventually leads to an effective production of the three-dimensional shaped object with a desired quality.

BRIEF DESCRIPTION OF THE DRAWINGS

FIG. 9 is a schematic view showing an embodiment of "Serially combined short sub-irradiation path".

FIG. 12 is a schematic view showing an embodiment of "Discrete scanning at region of short sub-irradiation path".

MODES FOR CARRYING OUT THE INVENTION

Figure 1A:
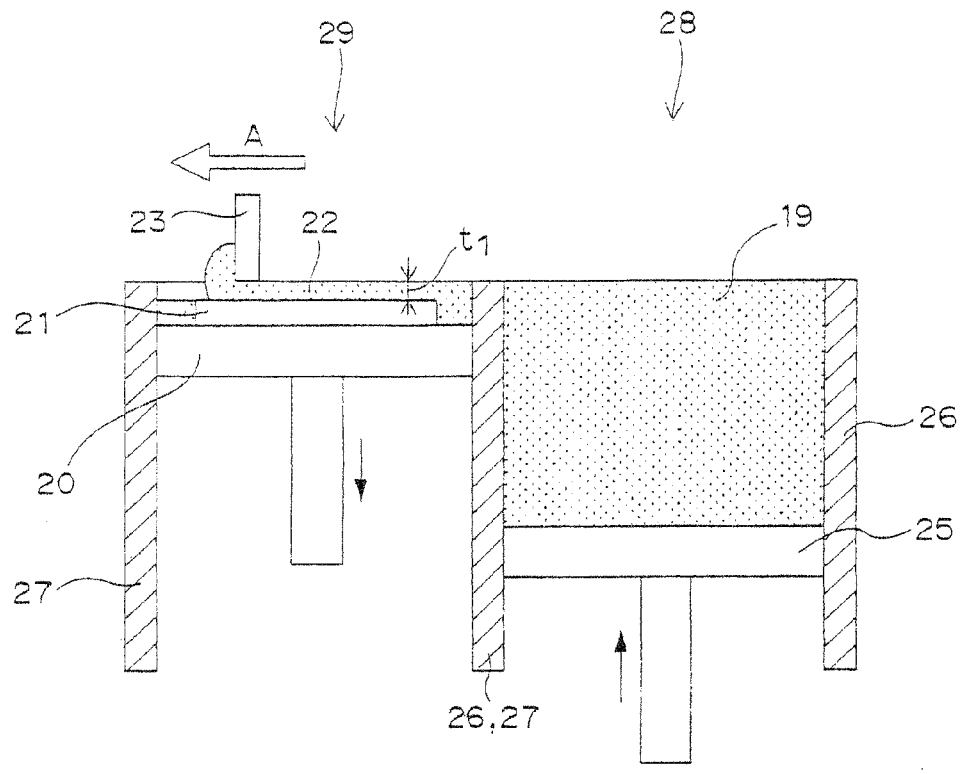
FIGS. 1A and 1B are sectional views schematically showing operations of a laser-sintering/machining hybrid machine.

An embodiment of the present invention will be described in more detail with reference to the accompanying drawings. It should be noted that dimensional proportions in the drawings are merely for illustrative purposes, and thus not the same as those of the actual parts or elements.

The term "powder layer" as used in this description and claims means, for example, "metal powder layer made of a metal powder" or "resin powder layer made of a resin powder". Also, the term "predetermined portion of a powder layer" substantially means a portion of a three-dimensional shaped object to be manufactured. Therefore, a powder existing in such predetermined portion is irradiated with a light beam, whereby, the powder undergoes a sintering or a melting and subsequent solidification thereof to form a shape of a three-dimensional shaped object. Furthermore, the term "solidified layer" substantially means "sintered layer" when the powder layer is a metal powder layer, whereas the term "solidified layer" substantially means "cured layer" when the powder layer is a resin powder layer.

[Selective Laser Sintering Method]

Figure 1B:
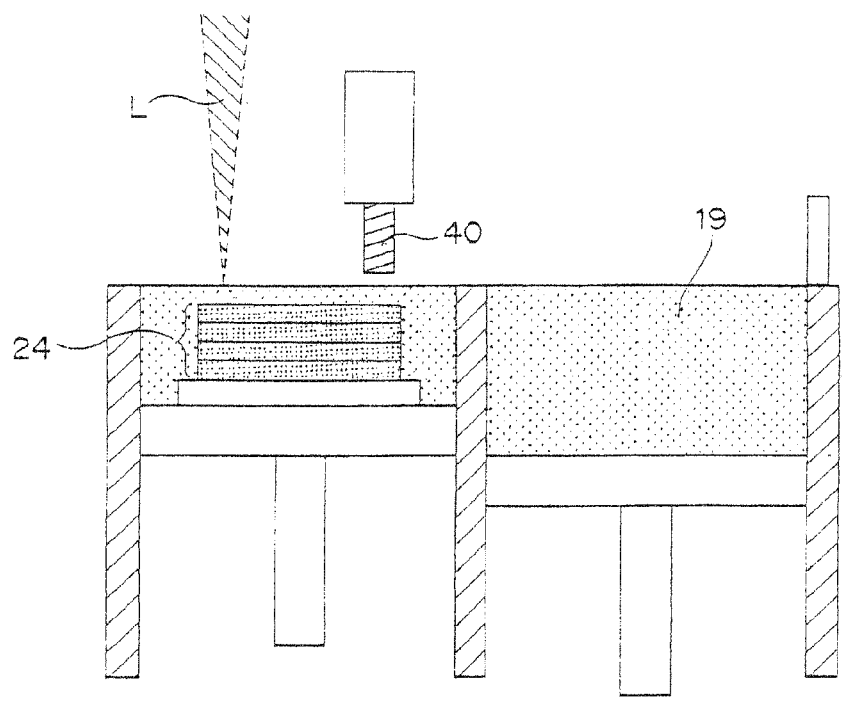
Figure 2A:
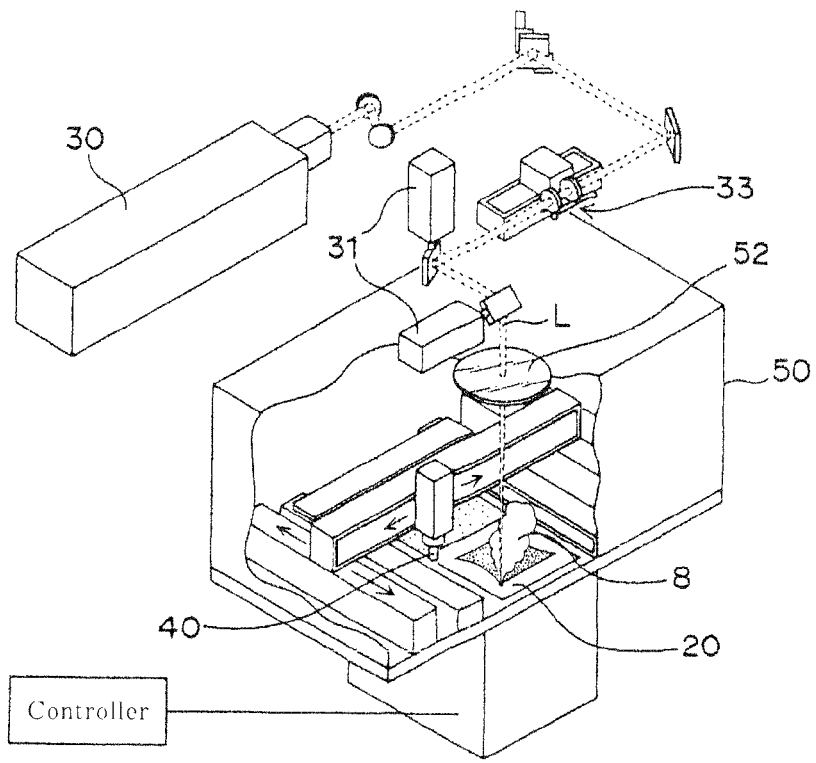
FIGS. 2A and 2B are perspective views schematically illustrating a device for performing a laser sintering (i.e., selective laser sintering method) wherein FIG. 2A especially shows a hybrid device with a machining mechanism, and FIG. 2B especially shows a device with no machining mechanism.
Figure 2B:
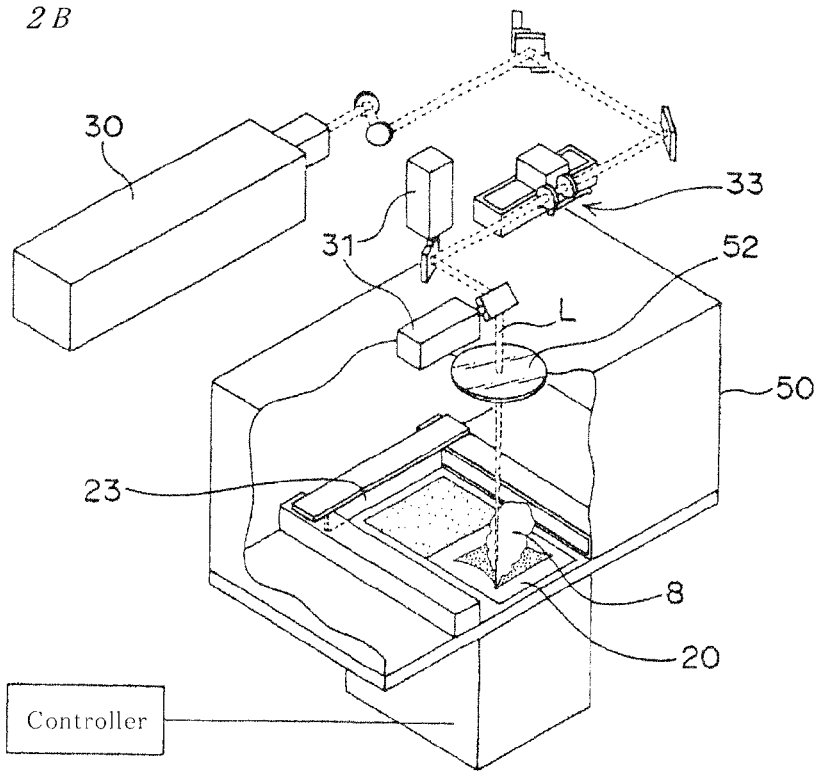
Figure 3:
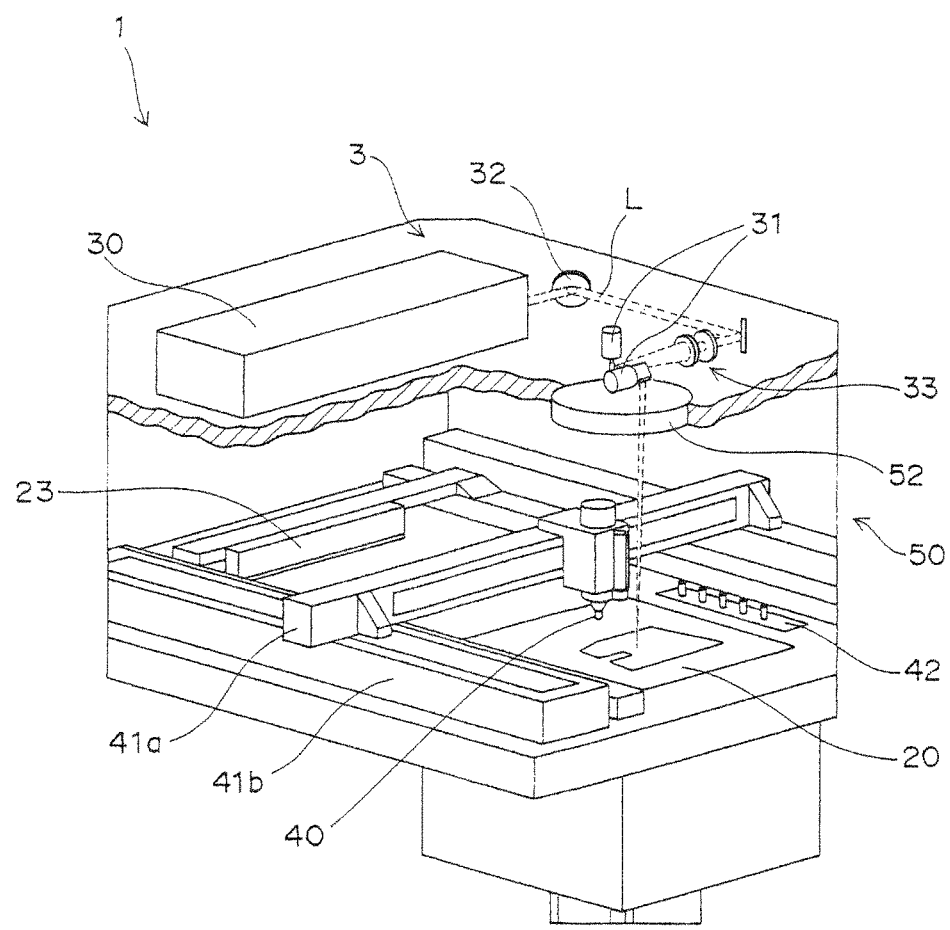
FIG. 3 is a perspective view schematically showing an embodiment in which a selective laser sintering method is carried out
Figure 4:
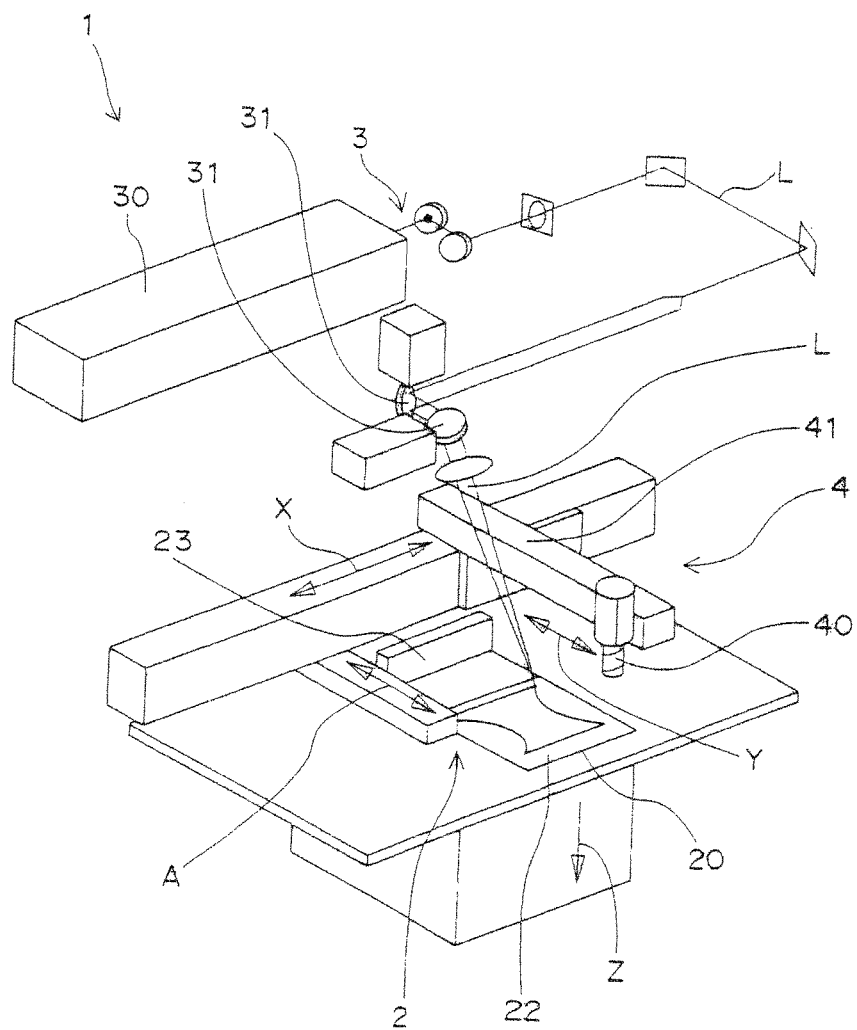
FIG. 4 is a perspective view schematically showing a constitution of a laser-sintering/machining hybrid machine by which a selective laser sintering method is carried out.

First, a selective laser sintering method, on which an embodiment of the manufacturing method of the present invention is based, will be described. For convenience, the selective laser sintering method, which will be described, is one where powder material is supplied from a storage tank therefor, followed by being flattened by means of a squeegee blade to form a powder layer therefrom. Moreover, by way of example, the selective laser sintering method wherein a machining process is additionally carried out with respect to the shaped object (i.e., the method embodiment as shown in FIG. 2A, not FIG. 2B) will be described. FIGS. 1A, 1B, 3 and 4 show functions and constitutions, which enable an execution of the selective laser sintering method, with respect to a metal laser sintering hybrid milling machine. The laser-sintering/milling hybrid machine 1 is mainly provided with a "powder layer forming means 2 for forming a powder layer by providing a powder such as a metal powder or a resin powder in a predetermined thickness"; a "forming table 20 which is capable of vertically elevating/descending by cylinder drive in a forming tank 29 whose outer periphery is surrounded with a wall 27"; a "base plate 21 for shaped object, which is disposed on the forming table 20 and serves as a platform of the shaped object"; a "light-beam irradiation means 3 for irradiating a desired position with an emitted light beam L"; and a "machining means 4 for milling the periphery of a shaped object". As shown in FIGS. 1A and 1B, the powder layer forming means 2 is mainly composed of a "powder table 25 capable of vertically elevating/descending by cylinder drive in a storage tank for powder material 28 whose outer periphery is surrounded with a wall 26" and a "squeegee blade 23 for forming a powder layer 22 on the base plate for shaped object or forming table". As shown in FIGS. 3 and 4, the light-beam irradiation means 3 is mainly composed of a "light beam generator 30 for emitting a light beam L" and a "galvanometer mirror 31 (i.e., scan optical system) for scanning a light beam L onto a powder layer 22". Optionally, the light-beam irradiation means 3 is equipped with a beam shape correcting means for correcting a shape of a light beam spot (e.g., a means composed of a pair of cylindrical lens and a rotation drive mechanism for rotating the lens around a shaft line of the light beam) and fθ lens. The machining means 4 is mainly composed of a "milling head 40 for milling the periphery of a shaped object" and a "X-Y actuator 41 (41a, 41b) for driving the milling head 40 to move toward the position to be milled" (see FIGS. 3 and 4)

Figure 5:
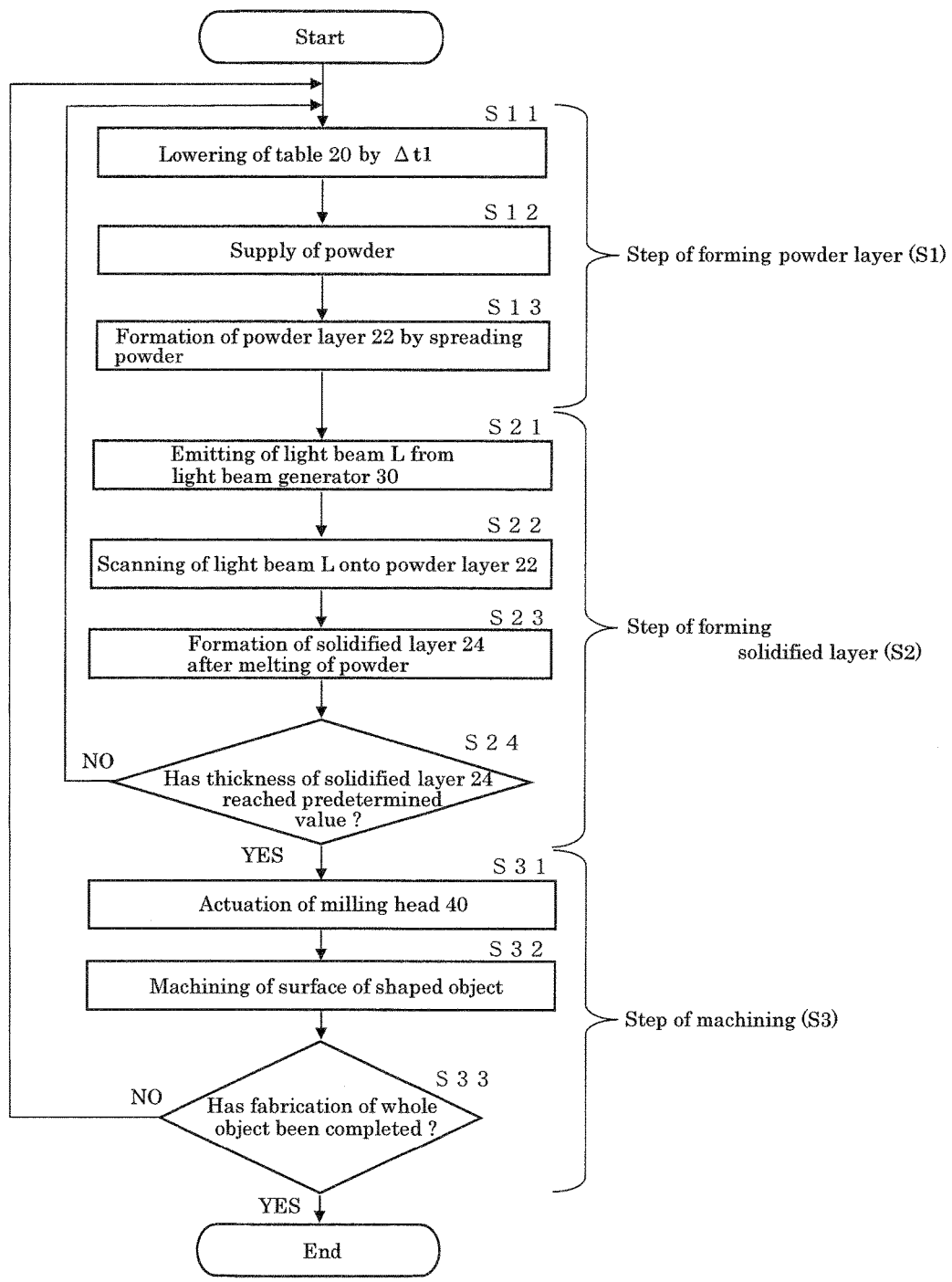
FIG. 5 is a flow chart of operations of a laser-sintering/machining hybrid machine.
Figure 6:
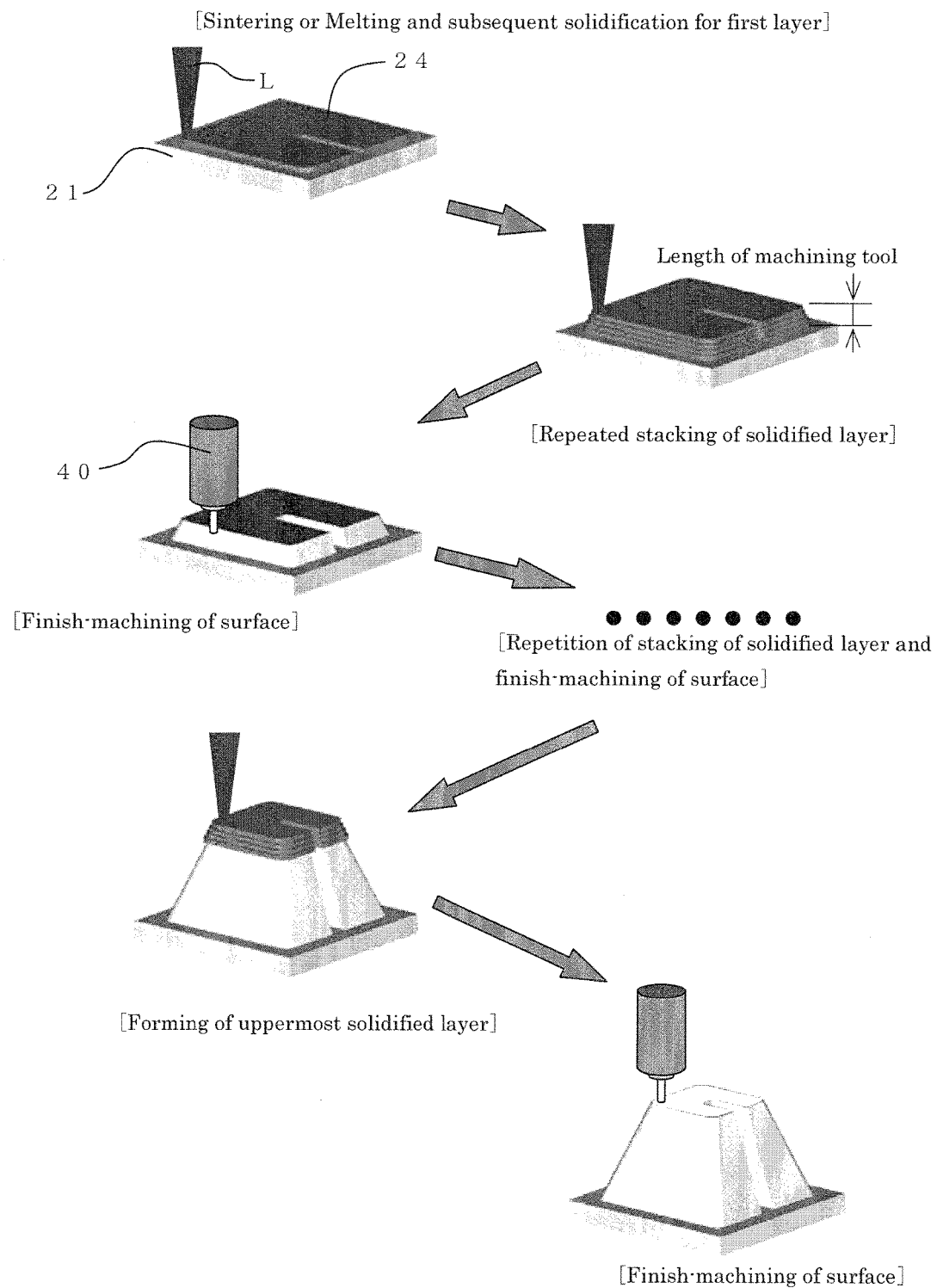
FIG. 6 is a schematic view showing a laser-sintering/machining hybrid process over time.

Operations of the metal laser sintering hybrid milling machine 1 will be described in detail with reference to FIGS. 1A, 1B, 5 and 6. FIG. 5 shows a general operation flow of a metal laser sintering hybrid milling machine. FIG. 6 schematically and simply shows a laser-sintering/machining hybrid process.

The operations of the metal laser sintering hybrid milling machine are mainly composed of a powder layer forming step (S1) of forming a powder layer 22; a solidified layer forming step (S2) of irradiating the powder layer 22 with a light beam L to form a solidified layer 24; and a machining step (S3) of milling a surface of a shaped object. In the powder layer forming step (S1), first, the forming table 20 is descended by Δt1 (S11). Subsequently, a powder table 25 is elevated by Δt1, and thereafter the squeegee blade 23 is driven to move in the direction of arrow "A" as shown in FIG. 1A. This enables a powder (e.g., an "iron powder having a mean particle diameter of about 5 μm to 100 μm" or a "powder having a mean particle diameter of about 30 μm to 100 μm, such as a powder of nylon, polypropylene or ABS") placed on the powder table 25 to be spread to form a powder layer 22 in a predetermined thickness Δt1 (S13), while being transferred onto the base plate 21 (S12). Following this step, the solidified layer forming step (S2) is performed. In the solidified layer forming step, a light beam L (e.g., carbon dioxide gas laser (about 500 W), Nd:YAG laser (about 500 W), fiber laser (about 500 W) or ultraviolet light) is emitted from the light beam generator 30 (S21) and then a light beam L is scanned onto a desired position of the powder layer 22 by means of the galvanometer mirror 31 (S22). The scanned light beam can cause the powder to be melted and then solidified, resulting in a formation of the solidified layer 24 integrated with the base plate 21 (S23). There is not limitation on transmission of the light beam in air, and the light beam may also be transmitted through an optical fiber or the like.

The powder layer forming step (S1) and the solidified layer forming step (S2) are repeatedly performed until the thickness of the stacked layers 24 reaches such a predetermined value that is determined based on a tool length of the milling head 40 (see FIG. 1B). Upon a sintering of the powder or a melting and subsequent solidification of the powder, the newly stacked solidified layer is integrated with the solidified layer which has already been formed and located therebeneath.

Figure 13:
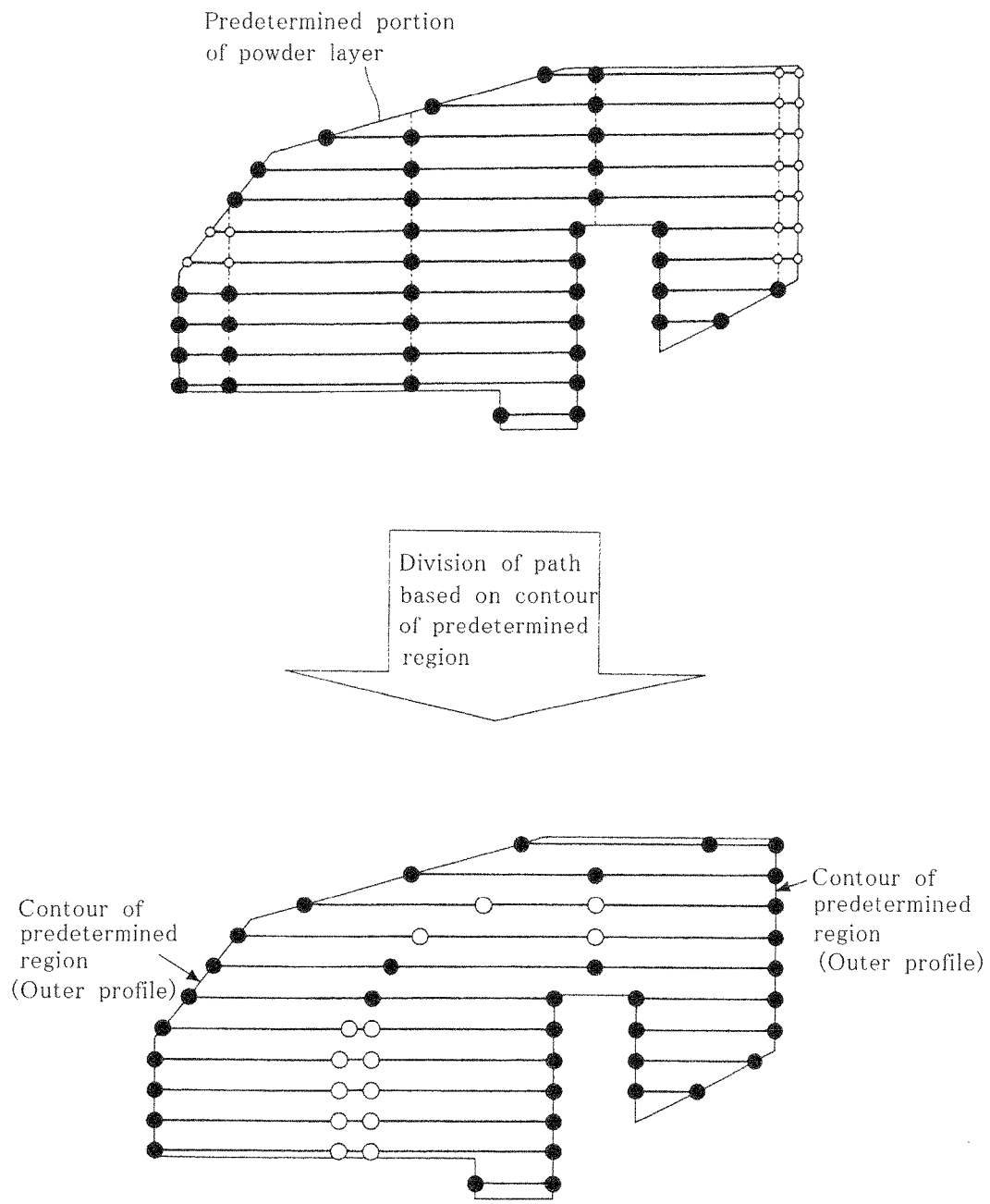
FIG. 13 is a schematic view showing an embodiment of "Formation of sub-irradiation paths on basis of contour".
Figure 14:
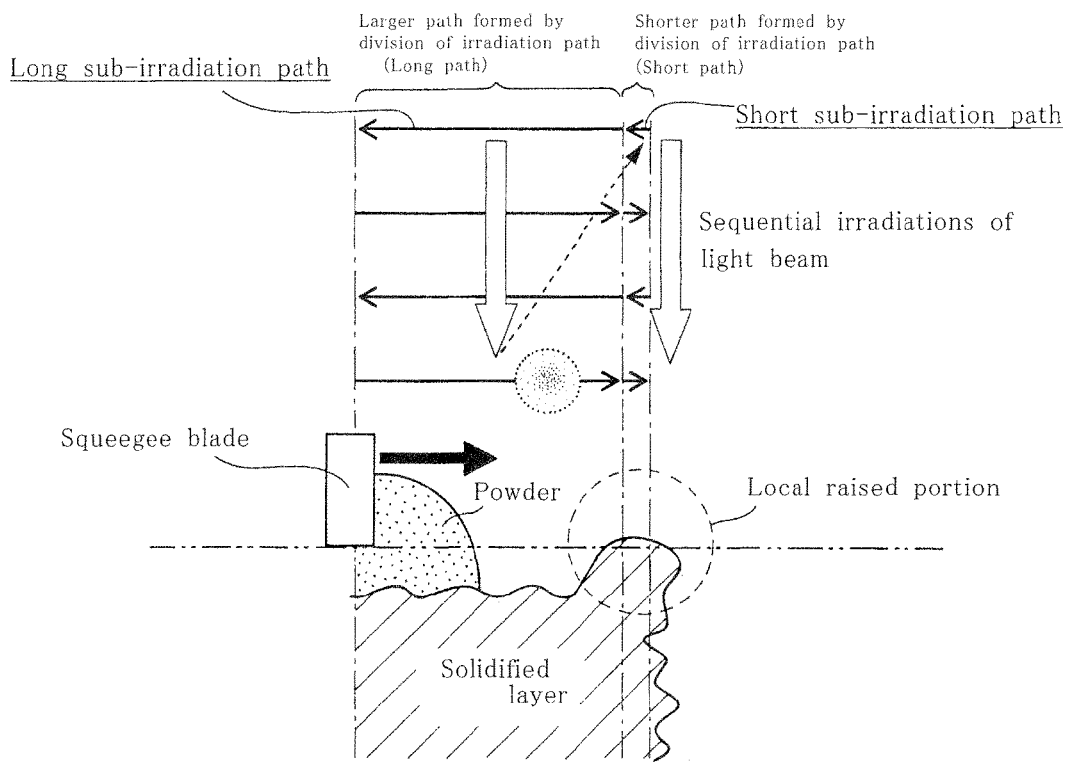
FIG. 14 is an illustration for explaining an embodiment wherein a local raised portion is formed (Related Art).

When the thickness of the stacked solidified layers 24 reaches a predetermined thickness, the machining step (S3) is initiated. In the embodiments as shown in FIG. 13 and FIG. 6, the milling head 40 is actuated to initiate execution of the machining step (S31). For example, in a case where the tool (ball end mill) of the milling head 40 has a diameter of 1 mm and an effective milling length of 3 mm, a milling with a milling depth of 3 mm can be performed. Therefore, when Δt1 is 0.05 mm, the milling head 40 is actuated when sixty solidified layers are formed. The milling head 40 is moved in X and Y directions by means of the X-Y actuator 41 (41a, 41b) and the shaped object composed of stacked solidified layers 24 is subjected to the surface machining (S32). When the entire three-dimensional shaped object has not yet been manufactured, the step returns to the powder layer forming step (S1). Thereafter, the steps S1 through S3 are repeatedly performed to further stack the solidified layers 24, which leads to a manufacturing of the desired three-dimensional shaped object (see FIG. 6)

An irradiation path of the light beam L in the solidified layer forming step (S2) and a milling path in the machining step (S3) are determined in advance using 3-D CAD data.

In this case, the machining path is determined by applying contour line processing. For example, in the solidified layer forming step (S2), the contour shape data of each of sliced sections, which are regularly-pitched (e.g., 0.05 mm pitch when Δt1 is 0.05 mm) sliced sections of STL data produced from a 3-D CAD model, are used.

[Manufacturing Method of the Present Invention]

Figure 7:
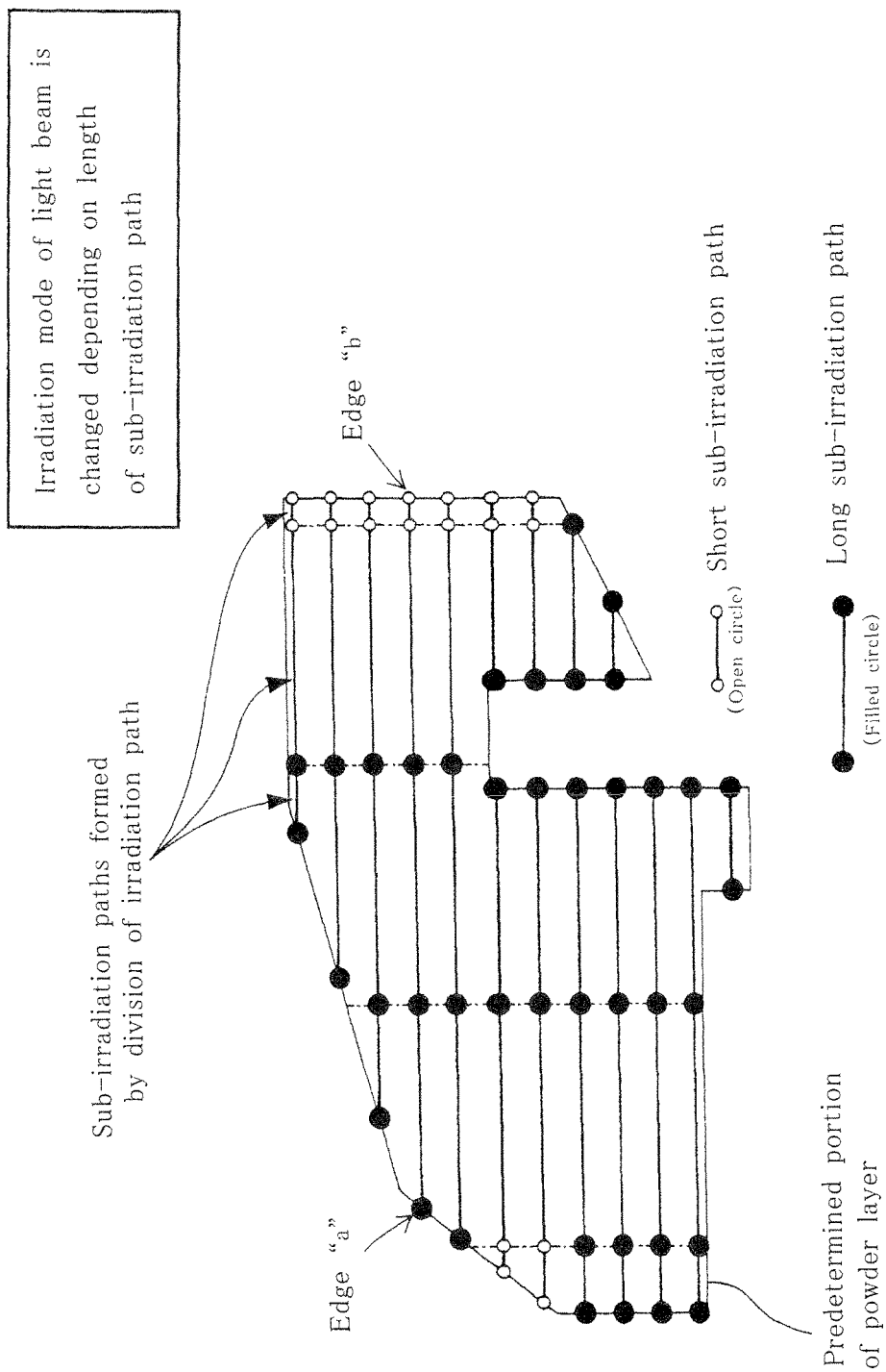
FIG. 7 is a schematic view showing an embodiment in which an irradiation path is divided into sub-irradiation paths including "short sub-irradiation path with its length being shorter than a predetermined length" and "long sub-irradiation path with its length being the predetermined length or longer".

An embodiment of the present invention is characterized by the solidified layer forming step performed in the above described selective laser sintering method. It is particularly characterized by a so-called "hatching path" is provided upon the formation of the solidified layer by the light irradiation of the predetermined portion of the powder layer, and/or characterized by an irradiating condition of the light beam. The "hatching path" is an irradiation path for the scanning of the light beam, based on which path the predetermined portion of the powder layer is irradiated like it is daubed. Specifically, an irradiation mode of the light beam according to an embodiment of the present invention is changed depending on the respective lengths of the hatching path, i.e., the respective lengths of the irradiation paths. For example, as shown in FIG. 7, the irradiation path is divided into "short sub-irradiation path with its length being shorter than a predetermined length" and "long sub-irradiation path with its length being the predetermined length or longer" in the irradiation region of the powder layer (i.e., in the powder layer region to be irradiated for the formation of the solidified layer), in which case the irradiation mode of the light beam is changed depending on the lengths of the divided irradiation path. This means that, when each of "short irradiation path" and "long irradiation path" is provided as a unit of seamless path based on which path the light beam is discontinuously irradiated, the irradiation mode of the light beam is changed according to the length of such path unit, i.e., the length of the seamless long or short path. In other words, the change of the irradiation mode of the light beam is performed depending on whether the path for the irradiation is long or short. The reason why the irradiation path is divided/segmented into the sub-irradiation paths is that the continuous scanning of the light beam from end to end of the predetermined portion of the powder layer (e.g., the continuous scanning of the light beam from edge "a" to edge "b" as shown in FIG. 7) can cause a large shrinkage (i.e., large residual stress) upon the formation of the solidified layer, which will promote a warpage of the resulting shaped object. See J. P. Kruth, et al.: Selective laser melting of iron-based powder, Journal of Materials Processing Technology, Vol. 149, No. 1-3 (2004), pp616-622.

The division of the irradiation path may be done as shown in FIG. 7. That is, the irradiation path may be divided such that the short sub-irradiation path is located at an outermost periphery of the predetermined portion of the powder layer. In the light of the fact that "local raised portion" generally tends to occur when the short sub-irradiation path is located at the outermost periphery (i.e., at the periphery of the predetermined portion of the powder layer), the manufacturing method according to an embodiment of the present invention can effectively reduce the occurring of such "local raised portion".

The phrase "irradiation mode of light beam is changed" as used in this description and claims means various kinds of modified mode of the light beam except for only the change of a scanning velocity of the light beam. In other words, examples of the changed irradiation mode of the light beam do not include the change of only the scanning velocity of the light beam.

Figure 8A:
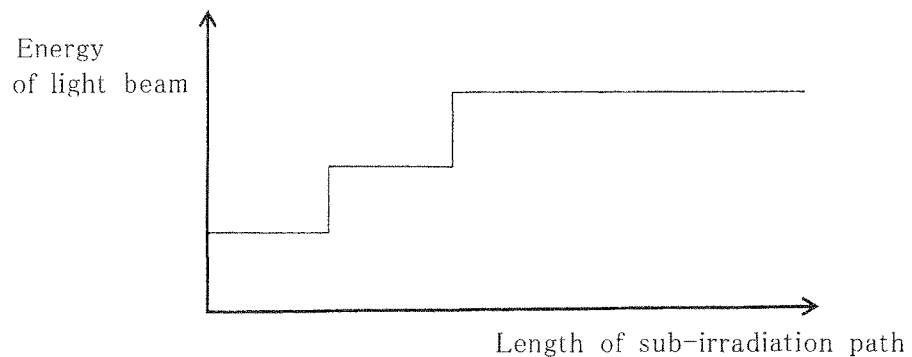
FIGS. 8A to 8C are schematic views showing embodiments in which irradiation modes of the light beam are changed depending on the lengths of the sub-irradiation paths.
Figure 8B:
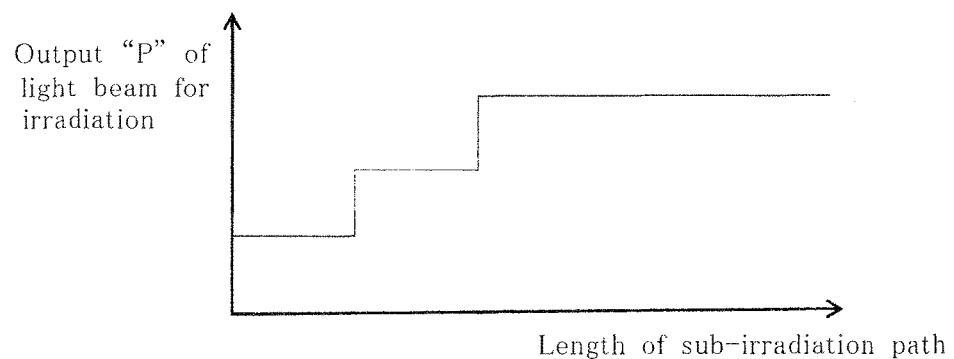
Figure 8C:
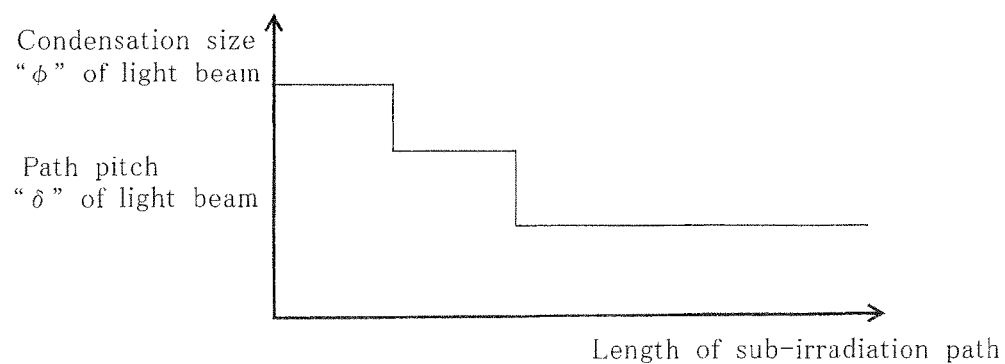

In the manufacturing method according to an embodiment of the present invention, an energy of the light beam, which is regarded as one of the irradiation mode, may be changed depending on the lengths of the sub-irradiation paths (see FIG. 8A). More specifically, the light beam for the short sub-irradiation path with its length being shorter than the predetermined length may have a lower energy than that for the long sub-irradiation path with its length being the predetermined length or longer. That is, the energy of the light beam for the short sub-irradiation path is lower than that of the long sub-irradiation path. This can more suitably prevent the occurring of the local raised portion. In this regard, an output "P" for the irradiation in the short sub-irradiation path may be lower than that of the long sub-irradiation path, for example (see FIG. 8B). The lower output "P" for the irradiation can suppress the temperature rise at the region of short sub-irradiation path when such region is irradiated with the light beam. Alternatively, a condensation size/diameter of the light beam (i.e., spot diameter Ø of the light beam) in the short sub-irradiation path may be larger than that of the long sub-irradiation path (see FIG. 8C). The larger condensation size of the light beam can prevent a rapid heating of the irradiated portion due to the dispersed energy of the light beam irradiation. Alternatively, a path pitch of the light beam (i.e., a spacing of the irradiation paths extending in parallel with each other) for the short sub-irradiation paths may be larger or wider than that of the long sub-irradiation paths (see FIG. 8C). The larger or wider pitch of the paths can also prevent a rapid heating of the irradiated portion due to the dispersed energy of the light beam irradiation. The lower output "P" for the irradiation, the larger beam-condensation size, and the larger pitch of beam paths may be combined with each other as needed. Furthermore, the lower output "P" for the irradiation, the larger beam-condensation size, and/or the larger pitch of beam paths may be combined with another change, e.g., the change of the scanning velocity of the light beam (e.g., higher scanning velocity of the light beam) as needed. By way of example, the irradiation of the light beam for the short sub-irradiation path can be performed in consideration of the lower output "P" for the irradiation, the larger beam-condensation size, and the larger pitch of beam paths with respect to the following conditions of the long sub-irradiation path:

Example of Condition for Long Sub-Irradiation path (laser type: $CO_2$ laser, thickness of powder layer: 0.05 mm, length of path: 5 mm)

Output for irradiation [W]: 100-1000
    Condensation size [mm] : 0.1-2.0
    Pitch of beam paths [mm]: 0.01-2.0

The predetermined length, i.e., the threshold value for distinguishing between "short sub-irradiation path" and "long sub-irradiation path" may be in the range of 0.1 to 2.0 mm (e.g., 1.5 mm), preferably in the range of 0.1 to 1.0 mm (e.g., 0.5 mm), for example. In this regard, in a case where the predetermined length, i.e., the threshold value is 1.5 mm, a path with its length being shorter than 1.5 mm is regarded as "short sub-irradiation path", and a path with its length being 1.5 mm or longer is regarded as "long sub-irradiation path". The maximum length of the long sub-irradiation path may be in the range of 3 mm to 15 mm, for example.

With respect to the the selective laser sintering method in which the irradiation path is divided, the local raised portion can be reduced in accordance with various embodiments. For example, the local raised portion can be reduced by the following embodiments according to the manufacturing method of the present invention wherein the irradiation path of the light beam is divided into "short sub-irradiation path" and "long sub-irradiation path".

(Serially Combined Short Sub-Irradiation Path)

An embodiment of "serially combined short sub-irradiation path" is shown in FIG. 9. According to this embodiment, the short sub-irradiation path and the long sub-irradiation path adjacent thereto are serially combined with each other to create another new long sub-irradiation path. As a result of this, no "short sub-irradiation path" is provided as the irradiation path for the predetermined portion of the powder layer at a point in time when the light beam irradiation is actually performed. No presence of "short sub-irradiation path" can avoid the occurring of the local raised portion attributed to such short path, which leads to the formation of approximately the uniform solidified layer as a whole. This makes it possible to suitably form the subsequent powder layer, which will eventually lead to an effective production of the three-dimensional shaped object with its desired quality.

According to this embodiment, the target "short sub-irradiation path" and the "long sub-irradiation path" located next to such target path in the scanning direction of the target path are integrally regarded as a single sub-irradiation path. This can be seen from an embodiment shown in FIG. 9. As such, the phrase "serially combined"/"serial combination" as used in this description and claims substantially means that the division between the sub-irradiation paths located adjacent to each other in the same path direction thereof is eliminated so as to create another new single sub-irradiation path therefrom.

(Perpendicular Scanning at Region of Short Sub-Irradiation Paths)

Figure 10:
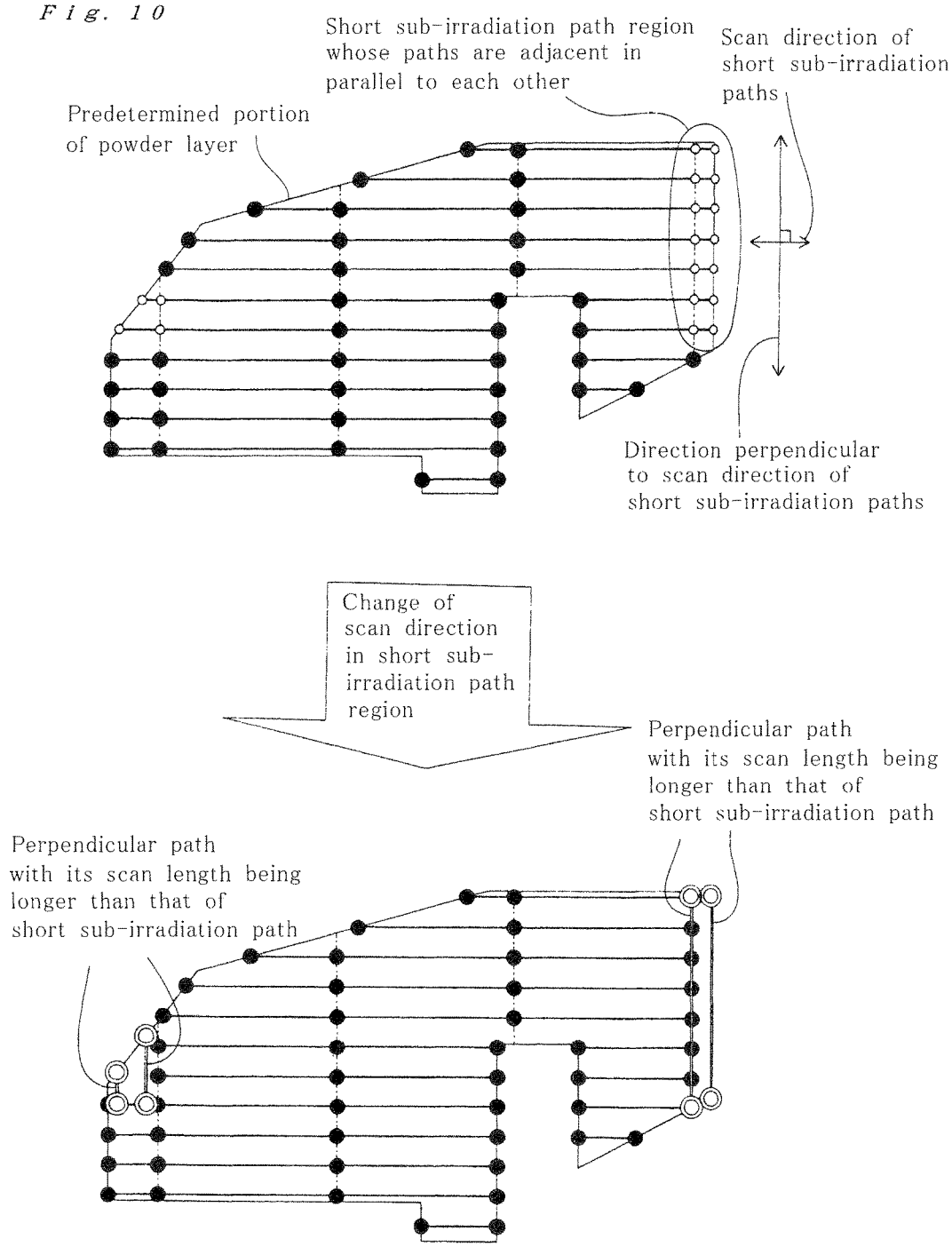
FIG. 10 is a schematic view showing an embodiment of "Perpendicular scanning at region of short sub-irradiation paths".

An embodiment of "perpendicular scanning at region of short sub-irradiation paths" is shown in FIG. 10. According to this embodiment, at such a local region that a plurality of the short sub-irradiation paths are located therein, a scanning of the light beam is performed in such a perpendicular direction with respect to the scanning direction of the short sub-irradiation paths that its path length becomes longer than each length of the short sub-irradiation paths. More specifically, in a case where a plurality of the short sub-irradiation paths are adjacent in parallel to each other along a direction perpendicular to a scan direction of the short sub-irradiation paths, the scanning of the light beam is performed in such a perpendicular direction that its path length becomes longer than each length of the short sub-irradiation paths, the perpendicular direction being perpendicular to the scan direction of the short sub-irradiation paths. See FIG. 10. In other words, the light beam irradiation is performed such that the scanning direction of the light beam at the region of the short sub-irradiation paths becomes different from that of other regions.

Such different direction of the scanning at the region of the short sub-irradiation paths can avoid the occurring of the local raised portion attributed to such short path, which leads to the formation of approximately the uniform solidified layer as a whole. This makes it possible to suitably form the subsequent powder layer, which will eventually lead to an effective production of the three-dimensional shaped object with its desired quality.

It should be noted that the term "perpendicular direction"/ "perpendicular" as used in this description and claims does not necessarily mean "90 °" with respect to the scanning direction of the short sub-irradiation path. The term "perpendicular direction"/"perpendicular" means a somewhat different degree of the angle range with respect to "90°", e.g., the degree of the angle in the range of 90°±20° for example. It may be the degree in the range of 90°±10° in some cases.

(Controlled Cooling Time)

Figure 11:
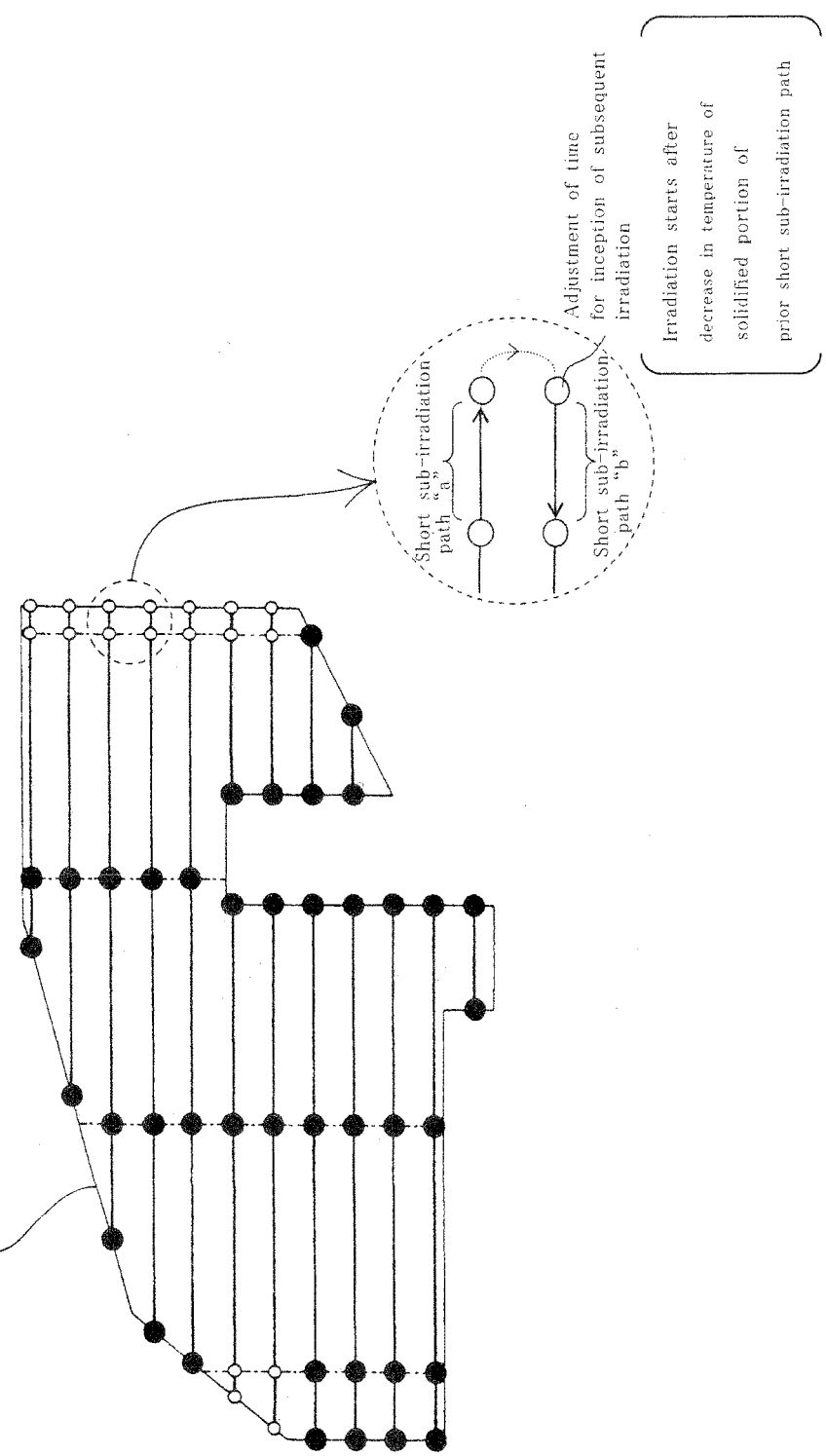
FIG. 11 is a schematic view showing an embodiment of "Controlled cooling time".

An embodiment of "controlled cooling time" is shown in FIG. 11. According to this embodiment, at a point in time after a decrease in the temperature of the prior short path region, the light beam irradiation for another short path region next thereto is performed. As shown in FIG. 11, in a case where paths "a" and "b" of the short sub-irradiation paths are adjacent in parallel to each other in a direction perpendicular to a scan direction of the paths "a" and "b", the irradiation of the light beam for the path "a" is firstly performed, and subsequently the irradiation of the light beam for the path "b" is performed at least after a decrease in a temperature of a solidified portion of the path "a". For example, the irradiation of the light beam for the short sub-irradiation path "b" is initiated at a point in time after the predetermined time after the completion of the light beam irradiation for the short sub-irradiation path "a". Such predetermined time may be in the range of 50 to 700 ms, preferably in the range of 80 to 600 ms.

The consideration of the cooling time for the solidified portion of the prior short sub-irradiation path can avoid the occurring of the local raised portion attributed to such short path, which leads to the formation of approximately the uniform solidified layer as a whole. This also makes it possible to suitably form the subsequent powder layer, which will eventually lead to an effective production of the three-dimensional shaped object with its desired quality.

For the purpose of measuring the temperature of the solidified portion in the short sub-irradiation path "a", a non-contact thermometer (e.g., thermography) may be used, for example. In this case, the temperature decrease of the solidified portion in the light beam irradiation for the short sub-irradiation path "a" can be confirmed by the non-contact thermometer at a point in time after the light beam irradiation of the short sub-irradiation path "a". After such confirmation of the temperature decrease, the subsequent light beam irradiation of the short sub-irradiation path "b" can be performed.

(Discrete Scanning at Region of Short Sub-Irradiation Paths)

An embodiment of "discrete scanning at region of short sub-irradiation paths" is shown in FIG. 12. According to this embodiment, no continuous irradiation is provided for the short sub-irradiation paths adjacent in parallel to each other. More specifically, the discrete scanning of the light beam is performed such that the adjacent short sub-irradiation paths are not subjected to a continuous scanning, the adjacent short sub-irradiation paths being adjacent in parallel to each other.

In other words, in a case where a plurality of the short sub-irradiation paths are adjacent in parallel to each other along a direction perpendicular to a scan direction of the short sub-irradiation paths, the adjacent short sub-irradiation paths are not subjected to the continuous scanning. For example, the irradiation of the light beam is performed such that one of the short sub-irradiation paths arranged in parallel is once skipped over, and the skipped path is eventually irradiated after the irradiations of the surrounding short sub-irradiation paths. Referring to FIG. 12, the irradiations of the light beam for the short sub-irradiation paths may be performed according to the order of (1)→(2)→(3) . . . in which case the irradiation of the light beam for the long sub-irradiation path may be performed in an interventional way during such irradiations of the short paths.

The discrete irradiation of the light beam can avoid the occurring of the local raised portion at the region of short sub-irradiation paths (i.e., at the region where a plurality of the short sub-irradiation paths are arranged in parallel), which leads to the formation of approximately the uniform solidified layer as a whole. This also makes it possible to suitably form the subsequent powder layer, which will eventually lead to an effective production of the three-dimensional shaped object with its desired quality.

It should be noted that the phrase "discrete scanning of the light beam" as used in this description and claims means that, in a case where a plurality of the short sub-irradiation paths are adjacent in parallel to each other along a direction perpendicular to a scan direction of the short sub-irradiation paths, the skip-mode scanning of the light beam is performed such that no continuous irradiation of the light beam is provided for the short sub-irradiation paths located next to each other.

(Creation of Sub-Irradiation Paths on Basis of Contour)

An embodiment of "creation of sub-irradiation paths on basis of contour" is shown in FIG. 13. According to this embodiment, the irradiation path is divided on such a basis of a contour line of the predetermined portion of the powder layer that the short sub-irradiation path is not located at an outermost periphery of the predetermined portion.

In the periphery of the irradiated portion where the short sub-irradiation path is located, there may be occurred such a phenomenon that the light beam-irradiated portion melts accompanying the inclusion of the adjacent powder, which causes an agglomeration of the melted portion due to a surface tension thereof. As a result, the local raised portion tends to occur more often in the short sub-irradiation path located especially at the periphery of the irradiated portion, with respect to the path located at the inner region of the irradiated portion. In this regard, the embodiment of the present invention creates a new hatching path on a basis of the contour of the predetermined portion to be irradiated such that no short path is provided at the edge of the model for the shaped object (i.e., at the periphery of "predetermined portion" of the powder layer). See FIG. 13. In other words, the hatching path for the light irradiation is re-created by regarding a point on the contour of the predetermined portion as a starting point of path. This means that the re-creating of the sub-irradiation paths is performed such that the short sub-irradiation path is positioned in the interior region of the model for the shaped object (i.e., on the inner side of the predetermined portion).

The positioning of the short sub-irradiation path on the inner side of the predetermined portion can avoid the occurring of the local raised portion, which leads to the formation of approximately the uniform solidified layer as a whole. Namely, the re-creating of the sub-irradiation paths as shown in FIG. 13 can avoid the occurring of the local raised portion (especially "local raised portion" attributed to the above phenomenon). This also makes it possible to suitably form the subsequent powder layer, which will eventually lead to an effective production of the three-dimensional shaped object with its desired quality.

Although a few embodiments of the present invention have been hereinbefore described, the present invention is not limited to these embodiments. It will be readily appreciated by those skilled in the art that various modifications are possible without departing from the scope of the present invention.

For example, the above various embodiments of the present invention, all of which serve to prevent the occurring of the local raised portion, may be each performed, and alternatively may be performed in combination thereof.

It should be noted that the present invention as described above includes the following aspects:

The First Aspect: A method for manufacturing a three-dimensional shaped object through repetition of a powder-layer forming and a solidified-layer forming, the repetition comprising the steps of:
  (i) forming a solidified layer by irradiating a predetermined portion of a powder layer with a light beam, thereby allowing a sintering of the powder in the predetermined portion or a melting and subsequent solidification thereof, the irradiation of the light beam being performed by a scanning of the light beam; and
  (ii) forming another solidified layer by newly forming a powder layer on the resulting solidified layer, followed by the irradiation of a predetermined portion of the powder layer with the light beam,
  wherein an irradiation path of the light beam for the predetermined portion is divided into a plurality of sub-irradiation paths composed of a short sub-irradiation path with its length being shorter than a predetermined length and a long sub-irradiation path with its length being the predetermined length or longer, and
  wherein an irradiation mode of the light beam is changed depending on the respective lengths of the sub-irradiation paths in the steps (i) and (ii).

The Second Aspect: The method according to the first aspect, wherein an energy of the light beam used for the short sub-irradiation path is lower than that of the long sub-irradiation path.

The Third Aspect: The method according to the second aspect, wherein a low output for the irradiation, a large beam-condensation size, or a large pitch of beam paths is provided for the light beam used for the short sub-irradiation path, the low output being lower, the large beam-condensation size and the large pitch being larger than those of the long sub-irradiation path.

The Fourth Aspect: The method according to anyone of the first to third aspects, wherein the irradiation path is divided such that the short sub-irradiation path is located at an outermost periphery of the predetermined portion of the powder layer.

The Fifth Aspect: The method according to any one of the first to fourth aspects, wherein the short and long sub-irradiation paths being adjacent to each other are serially combined with each other to create another new long sub-irradiation path.

The Sixth Aspect: The method according to any one of the first to fifth aspects, wherein, in a case where a plurality of the short sub-irradiation paths are adjacent in parallel to each other along a direction perpendicular to a scan direction of the short sub-irradiation paths, a scanning of the light beam is performed in such a perpendicular direction that its path length becomes longer than each length of the short sub-irradiation paths, the perpendicular direction being perpendicular to the scan direction of the short sub-irradiation paths.

The Seventh Aspect: The method according to any one of the first to sixth aspects, wherein, in a case where paths "a" and "b" of the short sub-irradiation paths are adjacent in parallel to each other along a direction perpendicular to a scan direction of the paths "a" and "b", the light beam irradiation for the path "a" is performed, and subsequently the light beam irradiation for the path "b" is performed at least after a decrease in a temperature of a solidified portion of the path The Eighth Aspect: The method according to any one of the first to seventh aspects, wherein a discrete scanning of the light beam is performed such that the adjacent short sub-irradiation paths are not subjected to a continuous irradiation of the light beam, the adjacent short sub-irradiation paths being adjacent in parallel to each other.

The Ninth Aspect: The method according to any one of the first to eighth aspects, wherein the irradiation path is divided on a basis of a contour line of the predetermined portion of the powder layer such that the short sub-irradiation path is not located at an outermost periphery of the predetermined portion.

INDUSTRIAL APPLICABILITY

The three-dimensional shaped object obtained by the manufacturing method according to an embodiment of the present invention can be used as various industrial articles. For example, in a case where the powder layer is a metal powder layer (i.e., inorganic powder layer) and thus the solidified layer corresponds to the sintered layer, the three-dimensional shaped object can be used as a metal mold for a plastic injection molding, a press molding, a die casting, a casting or a forging. While on the other hand in a case where the powder layer is a resin powder layer (i.e., organic powder layer) and thus the solidified layer corresponds to the cured layer, the three-dimensional shaped object can be used as a resin molded article.

CROSS REFERENCE TO RELATED PATENT APPLICATION

The present application claims the right of priority of Japanese Patent Application No. 2012-153738 (filed on Jul. 9, 2012, the title of the invention: "METHOD FOR MANUFACTURING THREE-DIMENSIONAL SHAPED OBJECT"), the whole Contents of which are incorporated herein by reference.

EXPLANATION OF REFERENCE NUMERALS

1 Laser-sintering/machining hybrid machine
2 Powder layer forming means
3 Light-beam irradiation means
4 Machining means
19 Powder/powder layer (e.g., metal powder/metal powder layer or resin powder/resin powder layer)
20 Forming table (i.e., supporting table)
21 Base plate for shaped object
22 Powder layer (e.g., metal powder layer or resin powder layer)
23 Squeegee blade
24 Solidified layer (e.g., sintered layer or cured layer) or three-dimensional shaped object made thereof
25 Powder table
26 Wall of storage tank for powder material
27 Wall of forming tank
28 Storage tank for powder material
29 Forming tank
30 Light beam generator
31 Galvanometer mirror
32 Reflecting mirror
33 Condensing lens
40 Milling head
41 X-Y actuator
41a X-axis actuator
41b Y-axis actuator
42 Tool magazine
50 Chamber
52 Window for transmission of light
L Light beam

The invention claimed is:
1. A method for manufacturing a three-dimensional shaped object by repetition of powder-layer forming and solidified-layer forming, the repetition comprising:
  (i) forming a solidified layer by irradiating a predetermined portion of a powder layer with a light beam, thereby sintering the powder in the predetermined portion or melting and subsequent solidification thereof, the irradiation of the light beam being performed by a scanning of the light beam; and
  (ii) forming another solidified layer by forming a new powder layer on the resulting solidified layer, followed by the irradiation of a predetermined portion of the new powder layer with the light beam,
  wherein an irradiation path of the light beam for the predetermined portion is divided into a plurality of sub-irradiation paths including a short sub-irradiation path with a length that is shorter than a predetermined length and a long sub-irradiation path with a length that is the predetermined length or longer,
  wherein an irradiation mode of the light beam in (i) and (ii) is changed depending on the lengths of the sub-irradiation paths, and
  wherein an energy of the light beam for the short sub-irradiation path is lower than an energy of the light beam for the long sub-irradiation path.

2. The method according to claim 1, wherein a low output for the irradiation, a large beam-condensation size, or a large pitch of beam paths is provided for the light beam of the short sub-irradiation path, the low output being lower, the large beam-condensation size and the large pitch being larger than the corresponding values of the long sub-irradiation path.

3. The method according to claim 1, wherein the irradiation path is divided such that the short sub-irradiation path is located at an outermost periphery of the predetermined portion of the powder layer.

4. The method according to claim 1, wherein, when a plurality of the short sub-irradiation paths are adjacent and parallel to each other in a direction perpendicular to a scan direction of the short sub-irradiation paths, a scanning of the light beam is performed in such a perpendicular direction that a scan path length becomes longer than each length of the short sub-irradiation paths, the perpendicular direction being perpendicular to the scan direction of the short sub-irradiation paths.

5. The method according to claim 1, wherein, when paths "a" and "b" of the short sub-irradiation paths are adjacent and parallel to each other in a direction perpendicular to a scan direction of the paths "a" and "b", the light beam irradiation for the path "a" is performed, and subsequently the light beam irradiation for the path "b" is performed at least after a decrease in a temperature of a solidified portion of the path "a".

6. The method according to claim 1, wherein a discrete scanning of the light beam is performed such that adjacent short sub-irradiation paths are not subjected to a continuous irradiation of the light beam, the adjacent short sub-irradiation paths being adjacent and parallel to each other.

7. The method according to claim 1, wherein the irradiation path is divided on a basis of a contour line of the predetermined portion of the powder layer such that the short sub-irradiation path is not located at an outermost periphery of the predetermined portion.

8. A method for creating an irradiation path of the light beam in manufacturing of a three-dimensional shaped object, the manufacturing being performed by repetition of powder-layer forming and solidified-layer forming, the repetition comprising:
(i) forming a solidified layer by irradiating a predetermined portion of a powder layer with a light beam, thereby sintering the powder in the predetermined portion or melting and subsequent solidification thereof, the irradiation of the light beam being performed by a scanning of the light beam; and
(ii) forming another solidified layer by forming a new powder layer on the resulting solidified layer, followed by the irradiation of a predetermined portion of the new powder layer with the light beam,
wherein, when a short sub-irradiation path with a length that is shorter than a predetermined length is provided upon a division of the irradiation path for the predetermined portion into a plurality of sub-irradiation paths, the short irradiation path and a long sub-irradiation path, with a length that is equal to or longer than the predetermined length, the long sub-irradiation path being adjacent to the short irradiation path, the paths are serially combined with each other to create another new long sub-irradiation path.

* * * * *